UNITED STATES PATENT OFFICE.

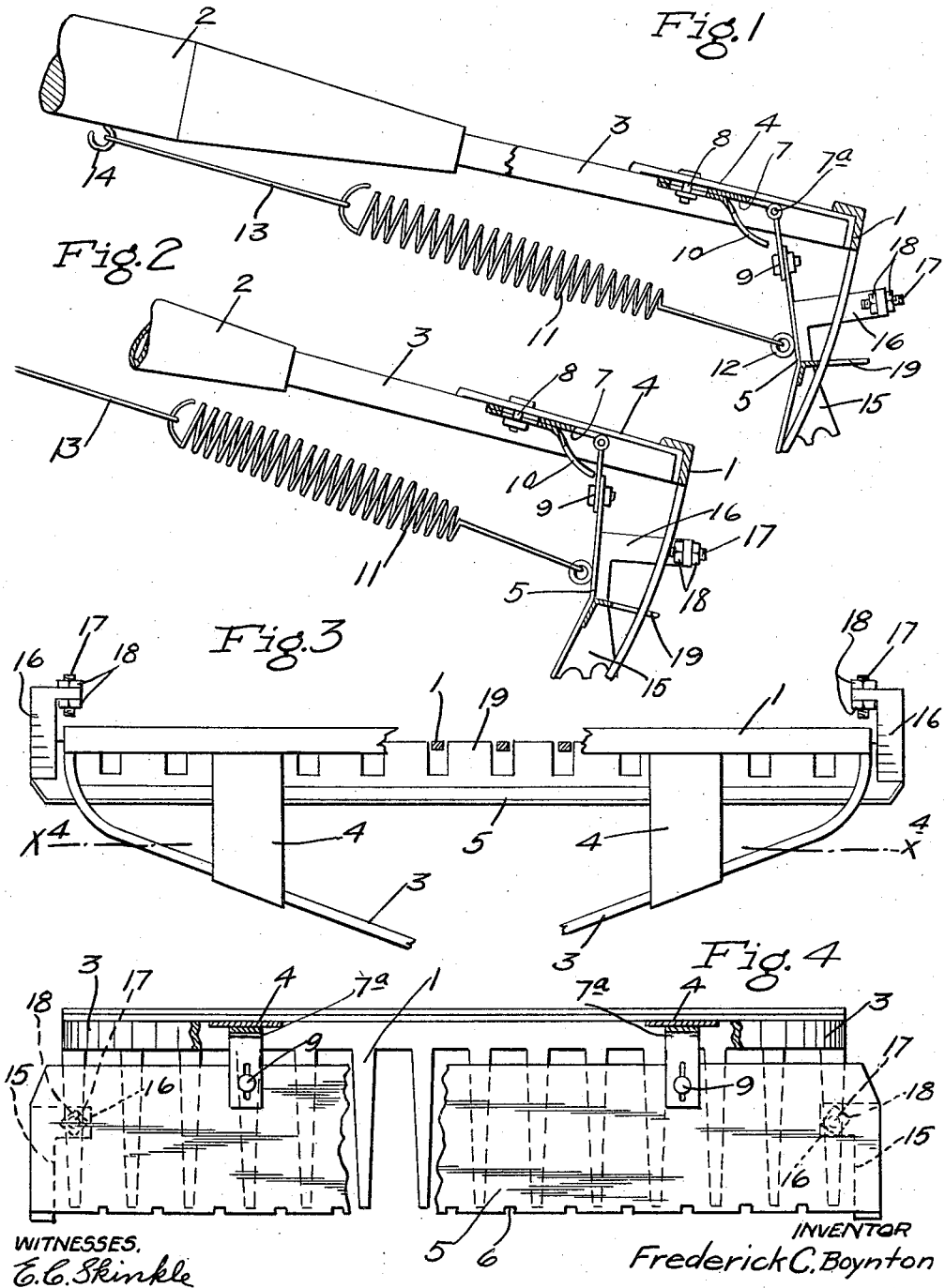

FREDERICK C. BOYNTON, OF SPRINGPARK, MINNESOTA, ASSIGNOR OF ONE-HALF TO ERNEST R. GAYLORD, OF MINNEAPOLIS, MINNESOTA.

COMBINED SCRAPER AND RAKE.

1,138,840. Specification of Letters Patent. Patented May 11, 1915.

Application filed June 11, 1914. Serial No. 844,419.

*To all whom it may concern:*

Be it known that I, FREDERICK C. BOYNTON, a citizen of the United States, residing at Springpark, in the county of Hennepin and State of Minnesota, have invented certain new and useful Improvements in a Combined Scraper and Rake; and I do hereby declare the following to be a full, clear, and exact description of the invention, such as will enable others skilled in the art to which it appertains to make and use the same.

My invention has for its object to provide a simple and efficient scraper attachment or device for rakes.

In the preferred arrangement, a scraper attachment is provided with a device for cleaning or loosening the grass and leaves from the rake teeth, so that the said attachment, in its preferred form, is in the nature of a combined scraper and cleaner. The complete device is in the nature of a combined scraper and rake.

Generally stated, the invention consists of the novel devices and combinations of devices hereinafter described and defined in the claims.

The attachment is especially adapted for use in raking up acorns, leaves and short cut grass which would pass between the teeth of an ordinary lawn or garden rake.

In the accompanying drawings which illustrate the invention, like characters indicate like parts throughout the several views.

Referring to the drawings: Figure 1 is a view partly in side elevation and partly in section showing the combined scraper and rake, some parts being broken away; Fig. 2 is a view corresponding to Fig. 1, but illustrating a different position of the scraper blade; Fig. 3 shows the combined rake and scraper in plan view with some parts broken away and with some parts sectioned; and Fig. 4 is a section taken on the line $x^4$ $x^4$ on Fig. 3.

The rake proper comprises an ordinary toothed rake bar 1, that is suitably connected to an ordinary handle or pole 2, but as shown, is connected thereto by bars 3 that radiate from the end of the pole and are rigidly attached to the ends of the said rake bar. As a convenient means for application of the scraper attachment to the rake, flat bars 4 are secured to the rake bar 1 and to the diverging bars 3. The blade 5 of the scraper is preferably made of quite thin sheet metal having its lower edge slightly notched at 6, at points between the lower ends of the rake teeth. At its upper edge, the scraper blade 5 is pivotally connected to the head of the rake, and preferably, its pivotal connection is made by a pair of hinges 7, the upper wings of which are rigidly but adjustably connected to the flat bars 4, by means of slot and bolt connections 8, whereas the depending oscillatory wings of the said hinges are adjustably connected to the upper edge of the said scraper blade by slot and bolt connections 9. The slot and bolt connections 9 permit vertical adjustments of the lower edge of the scraper blade, while the slot and bolt connections 8 permit forward and rearward adjustments of the hinge pivots $7^a$ in respect to the toothed rake bar 1. Preferably, the forward movement of the scraper blade is limited by stop devices in the form of resilient spring arms 10 that are adjustably connected to the rake head by the bolts 8 which pass also through slots therein.

The scraper blade is put under yielding strain to move forward by a coiled spring 11, the rear end of which, as shown, is connected to an eye 12 on the intermediate portion of the said scraper blade, and the front end of which is connected by a link or wire 13 to an anchoring hook or eye 14 on the handle 2.

Ground engaging shoes 15 preferably having serrated or toothed lower edges, are rigidly secured to the end portions of the scraper blade and are provided with rearwardly extended arms 16 having laterally projecting lugs through which adjustable stop screws 17 are arranged to work. Said stop screws 17 are preferably held in their set adjustments by jam nuts 18, and their inner ends are adapted to engage the end teeth of the toothed bar 1 to limit the forward movement of the scraper blade. The stop arms 10 are resilient or yielding, so that the blade, after engaging the same, may move still slightly farther forward until the front ends of the stop screws 18 engage the rake teeth. When desired, however, either one of the said stop devices 10 or 18 may be used independently of the other.

The scraper blade 5 is provided with a toothed or comb-like cleaning bar 19 that works between the teeth of the rake, and under the forward swinging movements of the scraper blade 5, forces downward on the rake teeth, any grass or leaves which may have stuck between the same. Furthermore, the said so-called cleaning blade 19 affords a stop for preventing grass and leaves from working their way between the rake teeth, upward beyond the same.

The operation of the combined rake and scraper is substantially as follows: When the rake is drawn forward, the engagement of the depending lower edge of the scraper blade 5, assisted by the engagement of the shoes 15 with the ground, will cause the said scraper blade to move rearward against the rake teeth or into a position shown in Fig. 1; and when the rake is then drawn forward, all acorns, leaves or like articles, which would otherwise pass between the rake teeth, will be scraped forward. Then when the pressure on the scraper blade is relieved at the limit of the forward movement of the rake, the spring 11 will quickly throw the scraper blade forward against the resilient stops 10. This statement, of course, assumes that the set screws 18 are set to permit the above noted engagement between the scraper blade and the said stop stem. The quick forward movement given to the scraper blade by the spring 11 causes the scraper blade to kick or propel forward the acorns, leaves, or other articles scraped up by the same, under forward movement of the rake; and furthermore, the resilient stops 10 will cause the scraper blade to stop with a trembling action which has the effect of cleaning the same of the articles scraped up thereby. The closeness with which the lower edge of the scraper blade and the lower ends of the rake teeth will engage with the ground may be regulated, by raising or lowering the front end of the handle 2. For example, downward movement of the front end of the handle will have the effect of lowering the lower edge of the scraper blade and raising the lower ends of the rake teeth, while raising of the front end of the said handle will have a reverse action, to-wit, will raise the lower edge of the scraper blade and lower the lower ends of the rake teeth.

In actual practice, the efficiency of the combined rake and scraper above described has been thoroughly demonstrated.

What I claim is:

1. The combination with a rake, of a scraper blade mounted for swinging movements in front thereof, having a ground engaging edge and provided with a portion having open notches in which the teeth of said rake normally lie, with the portions between notches projecting between the said teeth.

2. The combination with a rake, of a scraper blade mounted for swinging movements in front of the rake teeth, and yielding means tending to move said scraper blade forward; said scraper blade being vertically adjustable.

3. The combination with a rake, of a scraper blade mounted for swinging movements in front of the rake teeth, and yielding means tending to move said scraper blade forward, said scraper blade being vertically and forwardly and rearwardly adjustable.

4. The combination with a rake, of a scraper blade mounted for swinging movements in front of the rake teeth, and yielding means tending to move said scraper blade forward, said scraper blade having a toothed bar projecting rearward between the teeth of the rake.

5. The combination with a rake, of a scraper blade mounted for swinging movements in front of the rake teeth, and yielding means tending to move said scraper blade forward, said blade having ground engaging teeth at its ends.

6. The combination with a rake, of a scraper blade mounted for swinging movements in front of the rake teeth, and yielding means tending to move said scraper blade forward, and a stop carried by said scraper blade and engageable with the teeth of the rake.

7. The combination with a rake, of a scraper blade mounted for swinging movements in front of the rake teeth, and yielding means tending to move said scraper blade forward, and a resilient blade stop on the rake head limiting the forward movement of the scraper blade.

8. The combination with a rake, of a scraper blade mounted for swinging movements in front of the rake teeth, and yielding means tending to move said scraper blade forward, the said scraper blade having a notched lower edge.

In testimony whereof I affix my signature in presence of two witnesses.

FREDERICK C. BOYNTON.

Witnesses:
 HARRY D. KILGORE,
 F. D. MERCHANT.

Copies of this patent may be obtained for five cents each, by addressing the "Commissioner of Patents, Washington, D. C."